United States Patent
Tourunen (10) Patent No.: US 7,164,665 B2
(45) Date of Patent: Jan. 16, 2007

(54) TRANSFER OF IP DATA IN TELECOMMUNICATIONS SYSTEM

(75) Inventor: Ari Tourunen, Espoo (FI)

(73) Assignee: Nokia Corporation, Espoo (FI)

( * ) Notice: Subject to any disclaimer, the term of this patent is extended or adjusted under 35 U.S.C. 154(b) by 1031 days.

(21) Appl. No.: 10/045,021

(22) Filed: Jan. 15, 2002

(65) Prior Publication Data

US 2002/0093938 A1 Jul. 18, 2002

(30) Foreign Application Priority Data

Jan. 16, 2001 (FI) .................................. 20010099

(51) Int. Cl.
*H04Q 7/00* (2006.01)
(52) U.S. Cl. ........................................ 370/329; 370/392
(58) Field of Classification Search ................. 370/328, 370/329, 338, 389, 392, 401, 473, 474
See application file for complete search history.

(56) References Cited

U.S. PATENT DOCUMENTS

| | | | | |
|---|---|---|---|---|
| 5,909,431 | A * | 6/1999 | Kuthyar et al. ............. | 370/260 |
| 6,032,197 | A * | 2/2000 | Birdwell et al. ............ | 709/247 |
| 6,111,871 | A | 8/2000 | Chen et al. | |
| 6,134,244 | A | 10/2000 | Van Renesse et al. | |
| 6,711,164 | B1 * | 3/2004 | Le et al. ..................... | 370/392 |
| 6,963,570 | B1 * | 11/2005 | Agarwal ................. | 370/395.32 |
| 6,967,964 | B1 * | 11/2005 | Svanbro et al. ............. | 370/437 |
| 2002/0097722 | A1 * | 7/2002 | Liao et al. ................... | 370/392 |

FOREIGN PATENT DOCUMENTS

| | | |
|---|---|---|
| EP | 1 049 298 | 11/2000 |
| EP | 1 056 259 | 11/2000 |
| WO | WO 99/66736 | 12/1999 |
| WO | WO 00/76112 | 12/2000 |

OTHER PUBLICATIONS

Bormann, ed., "RObust Header Compression (ROHC)," draft document, version 4, dte Oct. 11, 2000, 137 pp.
Giovanardi et al., "Improved header compression for TCP/IP over wireless links," Electronics Letters, Nov. 9, 2000, Issue 23, vol. 36, pp. 1958-1960.
Brill, Manfred, Die anwendernahen Schichten im ISO/OSI-Modell, Teil 1, Elektronik, pp. 77-82, (Mar. 4, 1988).
The Layered Approach: The OSI Model, Protocols and Architecture, pp. 446-456.

* cited by examiner

*Primary Examiner*—Huy D. Vu
*Assistant Examiner*—Christine Ng
(74) *Attorney, Agent, or Firm*—Pillsbury Winthrop Shaw Pittman LLP (57) ABSTRACT

A method for transferring IP data comprising payload and header fields in a telecommunications system, the method comprising compression and decompression of the header fields of the IP packets. At least two logical connections are allocated for the transfer of header fields compressed on the basis of different contexts. Said header fields compressed on the basis of different contexts are transferred on separate logical connections.

14 Claims, 4 Drawing Sheets

TRANSFER OF IP DATA IN TELECOMMUNICATIONS SYSTEM

BACKGROUND OF THE INVENTION

The invention relates to the transfer of IP (Internet Protocol) data in a telecommunications system and particularly in a system providing compression of IP data header fields.

Rapidly advancing IP technology has expanded the field of use of diverse IP-based applications beyond the conventional Internet data transfer. IP-based telephone applications in particular have developed rapidly, due to which an ever increasing portion of the transfer path of the calls can be implemented using IP technology. Mobile communications networks in particular form an area where IP technology is anticipated to provide a host of advantages, because in addition to conventional speech services, which could be provided using different IP-based voice applications, mobile communications networks will be increasingly offering diverse data services, such as browsing of the Internet and electronic mail services, which are typically most advantageously produced as packet-switched IP-based services. Hence, IP-layers adapted to the protocols of the mobile communications system could be used for providing both audio/video services and various data services.

In mobile communications systems it is particularly important that the limited radio resources can be used as efficiently as possible. This, on the other hand, complicates the use of IP protocols on the radio interface because in IP-based protocols the proportion of different header fields in the data to be transferred is large and, consequently, the proportion left for the payload is small. Due to the limited radio resources, this ratio needs to be made smaller. For this purpose, header field compression methods, such as ROHC (Robust Header Compression) of IETF (Internet Engineering Task Force), have been designed. In this application, the term 'payload' is used for data which is substantially useful for the application employed and 'header fields' for fields added into the payload by lower layers taking care of data transfer of the application. In voice applications, the payload comprises for example voice samples and control data, the header fields on the network layer being for example RTP, UDP and IP header fields.

The proposed compression methods require uncompressed header fields to be transmitted at the beginning of a connection and possibly in a periodic manner. ROHC makes use of a plural number of compress states, the efficiency of the compression increasing as the operation proceeds to a higher state. A basic principle is that the compression is always carried out in the highest state possible, provided, however, that the compressor has sufficient certainty of the decompressor having enough information for carrying out decompression in the same state.

A logical connection is typically allocated to a convergence entity providing transmission of the application layer data flow to the mobile communications network on one hand and to the convergence entity of RNC on the other, the logical connection being used for transferring IP packets to the physical layer. According to the standards of the third generation mobile communications system UMTS (Universal Mobile Telecommunications System) the packet data convergence protocol (PDCP) layer entity always uses one radio link control (RLC) layer connection for transferring a data flow. When the RLC connection, and thereby the logical connection, is being allocated, parameters determining the characteristics of the logical connection, such as the quality of service level of the connection, are negotiated.

In the transmission of Voice over IP (VoIP) in particular, header fields may require considerably more bits than payload. Some of the header fields to be transferred may be compressed, which is why the size of the header fields in the IP packets to be transferred may vary considerably. Since the payload of the IP packets and the header fields compressed in different ways are transferred on the same logical connection conforming to the negotiated parameters, optimal use of radio resources is not achieved in the data transmission. A large amount of capacity must be reserved especially for an IP packet flow generated by a wideband speech codec WB AMR (Wideband Adaptive Multirate Codec) designed for UMTS, which leads to uneconomical use of the code tree.

BRIEF DESCRIPTION OF THE INVENTION

It is therefore an object of the invention to provide a method and an equipment implementing the method to allow IP data to be transferred more effectively over the radio interface. The objectives of the invention are achieved with a method, telecommunications system, mobile station and radio resource controller characterized by what is stated in the independent claims. The preferred embodiments of the invention are disclosed in the dependent claims.

The underlying idea of the invention is that the header fields of IP packets to be transferred are separated from the payload, after which header fields compressed on the basis of different contexts are transferred on separate logical connections allocated to them. A context represents the current properties of the compression, i.e. the compression of the header fields. It is to be noted that a compression context according to which the header field is not to be compressed at all is also possible. At the reception end the compressed header fields received on the different logical connections can be reconstructed and combined with the payloads. The term 'logical connection' refers to a data link layer (L2) connection used for transferring data between a mobile station and a packet radio network.

This provides a significant advantage in that logical connections of different characteristics can be allocated to differently compressed header fields which enables more optimal transmission of data and more efficient use of the radio channel capacity in a wireless telecommunications system.

According to a preferred embodiment of the invention, logical connections are allocated to header fields of different compress states. This allows header fields compressed to a different extent to be transmitted on different types of logical connections.

BRIEF DESCRIPTION OF THE DRAWINGS

In the following the invention will be described in greater detail in connection with preferred embodiments and with reference to the accompanying drawings, in which.

DETAILED DESCRIPTION OF THE INVENTION

In the following, the method of the invention will be described by way of example with reference to UMTS. However, the invention can be applied in any telecommunications system employing the compression of header fields of IP packets to be transmitted. The method of the invention can be advantageously applied for example in the projects for the further improvement of what are known as second generation mobile communications systems, such as GERAN (GSM/Edge Radio Access Network).

Figure 1:
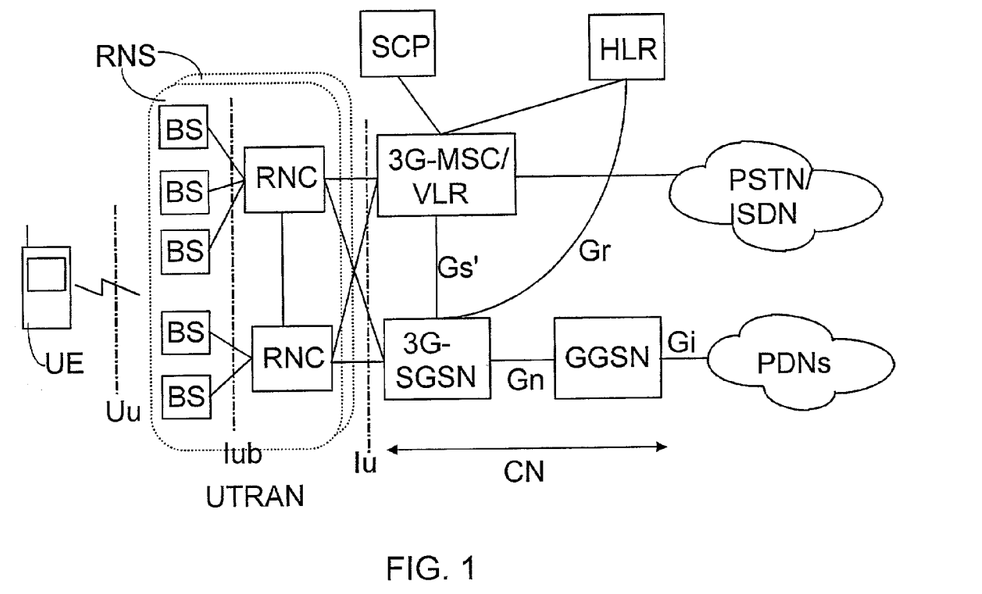
FIG. 1 is a block diagram illustrating a schematic view of the structure of UMTS.

FIG. 1 comprises only the UMTS system blocks that are essential for describing the invention, but a person skilled in the art will find it apparent that a conventional mobile communications system also comprises other functions and elements which need not be described in detail herein. The main parts of the mobile communications system are a core network CN and UMTS Terrestrial Radio Access Network UTRAN, which form the fixed network for the mobile communications system, and a mobile station or user equipment UE. The interface between CN and UTRAN is referred to as Iu and the air interface between UTRAN and UE as Uu.

UTRAN typically comprises a plurality of Radio Network Subsystems RNS, the interface between the subsystems being referred to as Iur (not shown). RNS comprises a Radio Network Controller RNC and one or more base stations BS, which are also referred to as node B. The interface between RNC and BS is referred to as Iub. A base station BS is typically responsible for the radio path implementation, the radio network controller RNC managing at least the following: radio resources management, control of intercell handover, power adjustment, timing and synchronization, paging of the user equipment. UE and BS comprise transceivers providing the data transmission over the radio path.

The core network CN is made up of an infrastructure belonging to the mobile communications system and external to UTRAN. In the core network, a Mobile Switching Centre/Visitor Location Register 3G-MSC/VLR is connected to a Home Location Register HLR and preferably also to a Service Control Point SCP of an intelligent network. The home location register HLR and the visitor location register VLR comprise information on mobile subscribers: the home location register HLR comprises information on all subscribers in the mobile communications network and the services they subscribe to, and the visitor location register VLR comprises information on mobile stations visiting the area of a particular mobile switching centre MSC. A connection to a serving node of a packet radio system 3G-SGSN (Serving GPRS Support Node) is formed through interface Gs and to a fixed telephone network PSTN/ISDN through a gateway mobile switching centre GMSC (Gateway MSC, not shown). The connection from both the mobile switching centre 3G-MSC/VLR and the serving node 3G-SGSN to the radio network UTRAN (UMTS Terrestrial Radio Access Network) is set up through interface Iu. It should be noted that UMTS is designed such that the core network CN may be identical to the core network of GSM, for example, in which case there is no need to rebuild the entire network infrastructure.

UMTS thus also comprises a packet radio system which is to a large extent implemented according to a GPRS system connected to a GSM network, which explains the references to a GPRS system in the names of the network elements. The UMTS packet radio system may comprise a plural number of gateway and serving nodes, several serving nodes 3G-SGSN being typically connected to one gateway node 3G-GGSN. The serving node 3-GSGSN is responsible for detecting mobile stations capable of packet radio connections in its service area, for transmitting and receiving data packets from said mobile stations and for monitoring the location of the mobile stations in its service area. Further, the serving node 3G-SGSN is in contact with the home location register HLR through interface Gr. Data records related to the packet radio service and comprising subscriber-specific packet data protocol contents are also stored in the home location register HLR.

The gateway node 3G-GGSN acts as a gateway between the UMTS network packet radio system and the external data network PDN (Packet Data Network). External data networks include the UMTS or GPRS network of another network operator, the Internet, an X.25 network or a private local area network. The gateway node 3G-GGSN communicates with said data networks through interface Gi. Data packets transmitted between the gateway node 3G-GGSN and the serving node 3G-SGSN are always encapsulated according to the gateway tunneling protocol GTP. The gateway node 3G-GGSN also comprises the addresses of PDP (Packet Data Protocol) contexts activated for the mobile stations, and their routing information, i.e. 3G-SGSN addresses. The routing information is thus used to link the data packets between the external data network and the serving node 3G-SGSN. The network between the gateway node 3G-GGSN and the serving node 3G-SGSN employs an IP protocol, preferably the IPv6 (Internet Protocol, version 6).

Figure 2A:
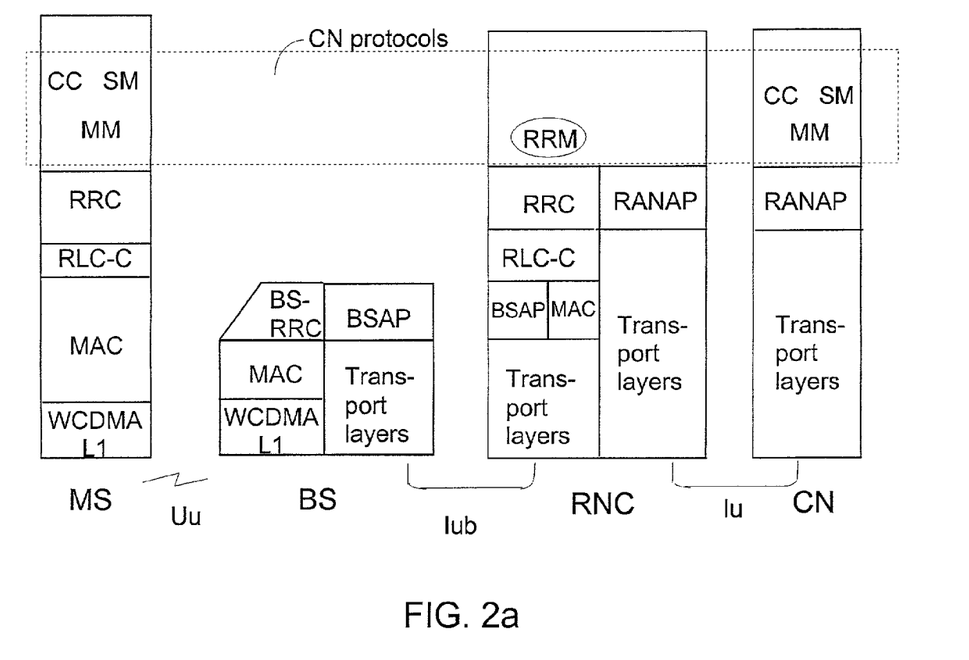
FIGS. 2a and 2b illustrate protocol stacks of an UMTS packet data service for control signalling and transmission of user data.
Figure 2B:
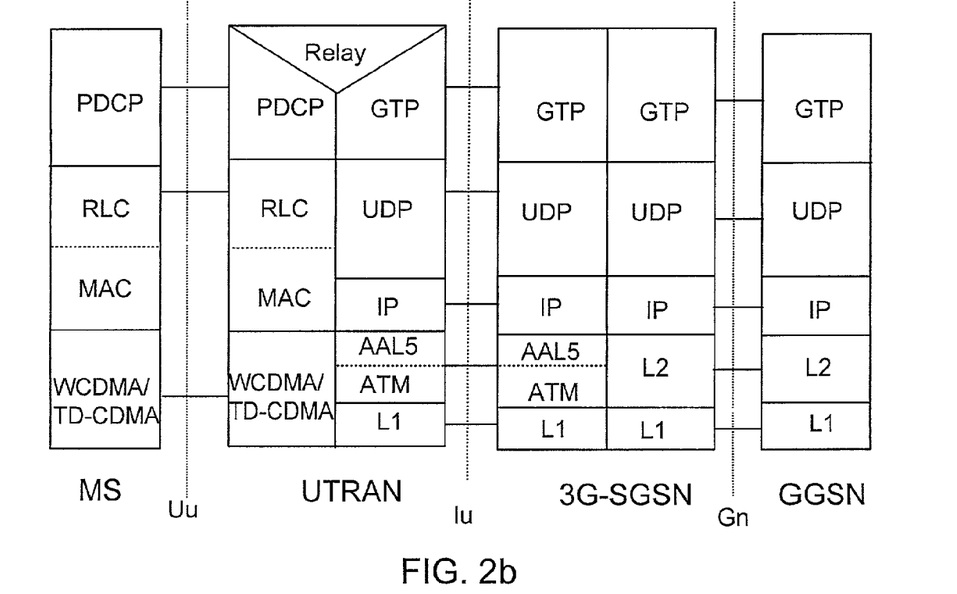

FIGS. 2a and 2b show UMTS protocol stacks used for control signalling (control plane) and transmission of user data (user plane) in the packet radio service provided by UMTS. FIG. 2a shows the protocol stack used for control signalling between the mobile station MS and the core network CN. Mobility management MM, call control CC and session management SM of the mobile station MS are signalled on the highest protocol layers between the mobile station MS and the core network CN in such a manner that the base stations BS and the radio network controller RNC located in between are transparent to this signalling. The radio resources management of radio links between mobile stations MS and base stations BS is carried out by a radio resource management system RRM which transmits control data from the radio network controller RNC to the base stations BS. These functions associated with the general management of a mobile system form a group called core network protocols (CN protocols), also known as Non-Access Stratum. Correspondingly, the signalling related to the radio network control between the mobile station MS, the base station BS and the radio network controller RNC is carried out on protocol layers called radio access network protocols (RAN protocols), i.e. Access Stratum. These include transfer protocols of the lowest level, whose control signalling is transferred to the higher levels for further processing. The most essential one of the higher Access Stratum layers is the radio resource control protocol RRC which is responsible for example for establishing, configuring, maintaining and releasing logical connections between the mobile station MS and the radio network UTRAN and for transmitting control information from the core network CN and the radio network RAN to the mobile stations MS. In addition, the radio resource control protocol RRC is responsible for allocating sufficient capacity according to the instructions of the radio resource management system RRM to a user terminal connection in an application-based capacity allocation, for example.

UMTS packet-switched user data is transmitted using a protocol stack shown in FIG. 2b. On interface Uu between the radio network UTRAN and the mobile station MS, lower-level data transmission on physical layer is performed according to a WCDMA or TD-CDMA protocol. A MAC layer above the physical layer transmits data packets between the physical layer and an RLC (Radio Link Control) layer, the RLC layer handling the management of the radio links of the different logical connections. The RLC functions comprise for instance segmentation of the user data (RLC-SDU) to be transmitted into one or more RLC data packets RLC-PDU. The IP header fields in data packets (PDCP-PDU) of the PDCP layer above RLC can optionally be compressed. The PDCP-PDUs are then handed over to RLC and they correspond to one RLC-SDU. The user data and the RLC-SDUs are segmented and transmitted in RLC frames to which address and verification information essential for the data transmission is added. The RLC layer also takes care of re-transmission of damaged frames. PDCP, RLC and MAC form the data link layer. The serving node 3G-SGSN is responsible for routing data packets coming from the mobile station MS through the radio network RAN further to the correct gateway node 3G-GGSN. This connection uses tunneling protocol GTP which encapsulates and tunnels all user data and signalling to be transmitted through the core network. The GTP protocol runs on top of the IP used by the core network.

In the following, a header field compression method ROHC of a preferred embodiment of the invention will be described. With regard to a more detailed description of the compression method in question, reference is made to an unfinished Internet draft "Robust Header Compression (ROHC)", version 04, 11.10.2000.

One of the underlying ideas of the ROHC development work is that there is plenty of redundancy between the numerous header fields used for transmitting data packets, not only within the data packets but also between them. In other words, a major part of the header field information does not change at all during the transmission of the data packets, the information thus being easy to reconstruct even if it were not sent at all. Only a minor portion of the header fields contains information to which special attention must be paid during compression.

In the different compression methods, a context is typically defined both for the compressor and the decompressor, the context being a state according to which the compressor compresses the header field to be transmitted and the decompressor decompresses the received header field. The context typically also comprises an uncompressed version of the previous header field transmitted (by the compressor) or received (by the decompressor) over the data transmission connection. In addition, a context may comprise diverse data identifying the data packet flow, such as sequence numbers and time stamps of the data packets. The context thus typically comprises both static information, which remains the same for the entire data flow, and dynamic information, which changes during the data packet flow, although often according to a predetermined pattern. The context comprises information about the compress state and the compress mode.

ROHC comprises a plural number of compress states, the efficiency of the compression increasing as the operation proceeds to a higher state. ROHC always tries to use the most efficient compression possible, provided, however, that before a next state is entered, it is confirmed that the operational reliability of that state is sufficient. The compress states used by ROHC in connection with the compression of the header fields of IP (Internet Protocol), UDP (User Datagram Protocol) and RTP (Real-Time Protocol) are Initiation/Refresh (IR), First Order (FO) and Second Order (SO), the transitions between the states being described in the diagram of FIG. 3. The IR state is used for creating a context for the decompressor or for recovering from an error situation. The compressor moves to the IR state when the compression of the header fields begins, either at the decompressor's request or because an update timer expires. In the IR state the compressor sends IR header fields in an uncompressed state. After confirmed reception of update information by the decompressor, the compressor attempts to move to a higher state. Factors having an impact on the transition from one compress state to another include variations in successive header fields, positive and negative acknowledgements received from the decompressor and, in the absence of acknowledgements, the expiration of predetermined cyclic counters. Similarly, a transition from a higher compress state to a lower one is possible, when necessary.

Figure 3:
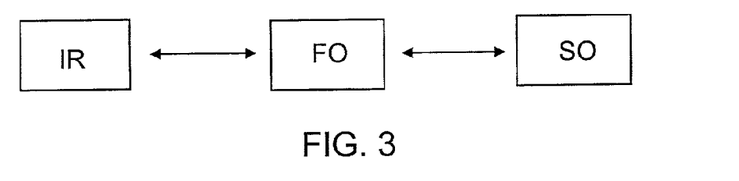
FIG. 3 is a block diagram illustrating transitions taking place between different compress states of ROHC.

The FO state is used for informing the recipient of any irregularities in the header fields of the data packet flow. After the IR state, the compressor operates in the FO state in a situation where the header fields do not form a uniform pattern (in other words, successive header fields change randomly and the changes cannot be anticipated) or the compressor cannot be sure that the decompressor has received parameters defining a uniform pattern for the header fields. This is a typical situation for example when transmission of speech is being initiated, particularly during the first speech bursts. In the FO state the compressor sends compressed FO header fields. When the header fields form a uniform pattern and after the reception of the uniform header field pattern by the decompressor has been confirmed, the compressor again attempts to move to a higher state. The data packets in the FO state typically comprise context update information, a successful decompression thus requiring that successive FO header fields are successfully transmitted as well. Consequently, the success of the decompress process is sensitive to lost or damaged FO state packets.

In the SO state, compression is optimal. The header fields form a uniform pattern which the compressor describes using compressed SO header fields which are in practice sequence numbers of the data packets. Information about the parameters defining the uniform header field pattern is transmitted to the decompressor already in the FO state, and on the basis of the parameters and the received sequence number the decompressor is able to extrapolate the original header fields. Since the data packets transmitted in the SO state are in practice independent of each other, the probability of error in the decompression is also low. When the header fields no longer form a uniform pattern, the compressor moves back to the FO state.

Three different states are defined for the decompression as well, the states being associated with the context defined for the decompressor. The operation of the decompressor always starts at the lowest state where no context has been defined yet (No Context). At this state the decompressor has not decompressed any data packets yet. When the decompressor has decompressed the first data packet, which comprises both static and dynamic context information, the decompressor may pass the middle state (Static Context) and directly enter the highest state (Full Context). Due to a plural number of error situations occurring at the highest state, the decompressor moves to the middle state, but even a single successfully decompressed data packet typically returns the decompressor to the highest state.

In addition to the different compress states, three different operational modes are defined for ROHC: unidirectional mode (U mode), bidirectional optimistic mode (O mode) and bi-directional reliable mode (R mode). Each one of the above described compress states (IR, FO, SO) functions in each mode, but each mode functions in each state its own way and also makes the decision about transitions between the states its own way. The choice of the operational mode for a particular compress situation depends on the parameters of the data transmission connection to be used, such as the possibility to use a return channel, the probability of errors and their distribution, the effects of variations on header field sizes, etc.

The three operational modes of the ROHC and the three compress states form different operational situations regarding the compression of the header fields, each situation requiring that the operation of the compressor and decompressor as well as the transmission of packets between them be defined. ROHC makes use of different packets for the different purposes required by the different operational situations. At the moment there are six different data packet types defined for ROHC, four of which are used for transmission from the compressor to the decompressor and two as return channel data packets from the decompressor to the compressor. Although the number of data packets to be used may change in the future, a common characteristic of all the data packet types is that each data packet can be provided with a Context Indicator CID defining the context to be used in each particular case before the packet is sent to the transfer path.

Figure 4:
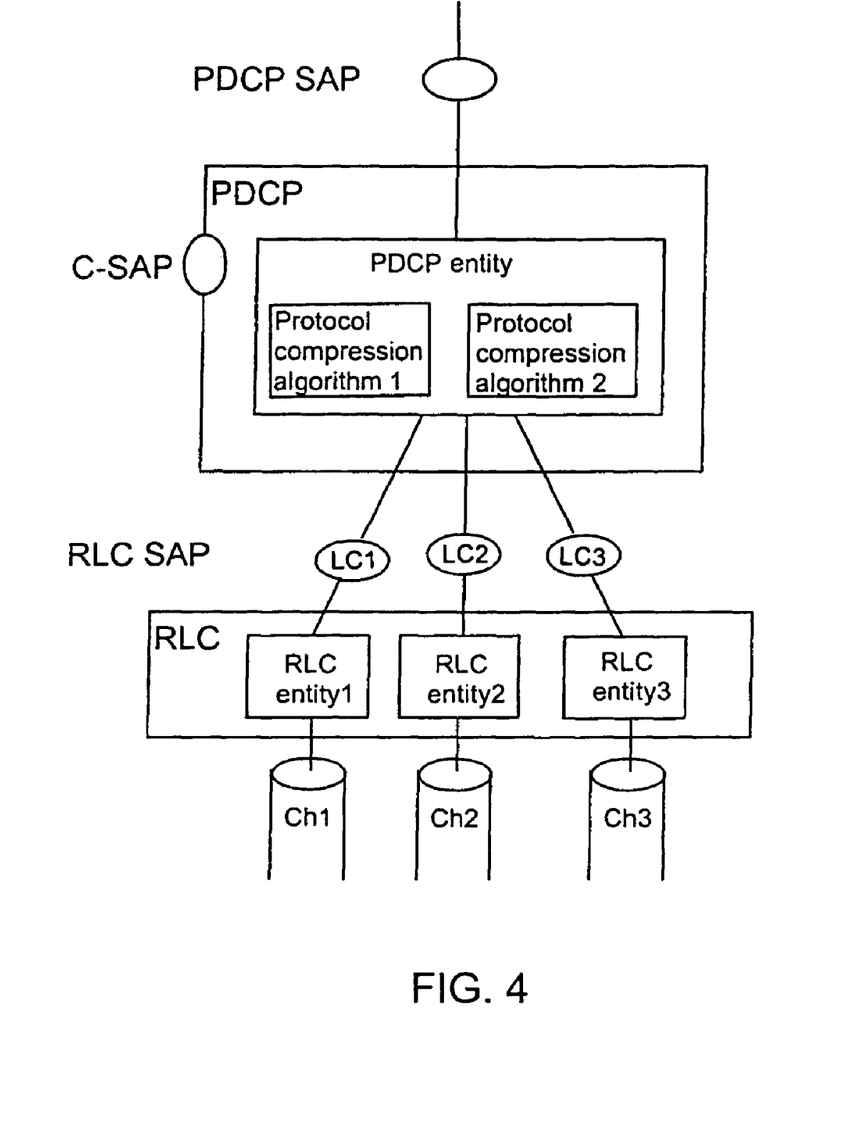
FIG. 4 illustrates RLC and PDCP layers in a system according to a preferred embodiment of the invention.

FIG. 4 illustrates RLC and PDCP layers in UMTS according to a preferred embodiment of the invention. To each PDP context, one PDCP entity is allocated. The sending PDCP and the receiving PDCP comprise a compressor-decompressor pair for compressing the data packets to be transmitted and for decompressing the received data packets. The PDCP entity may use one or more header field compression algorithms, or it does not necessarily use any. Several PDCP entities may also use a common algorithm. In UMTS, the compression of header fields of the data packets to be transmitted and the decompression of those of the received data packets thus take place on the convergence protocol layer PDCP. In addition to the above described ROHC, PDCP preferably supports other compression algorithms as well, such as the algorithm conforming to RFC2507 of IETF, where a compression may comprise a plural number of contexts.

The PDCP entity may be mapped to a plural number of RLC entities which allows a plural number of logical connections LC1–LC3 to be offered to one PDCP entity. Separate logical connections LC1–LC3 are allocated to the payload and to the differently compressed (different context) header fields. The payload and the header fields of the IP packets to be transmitted are separated, and, after the compression, the differently compressed header fields are transmitted on separate logical connections LC1–LC3. This allows the PDCP entity to use separate logical connections for header fields compressed on the basis of different contexts (at least two mainly different compress states and/or modes). The payload can also be transferred using a plural number of separate logical connections.

According to a preferred embodiment of the invention, separate logical connections are allocated to the different compress states. In the preferred embodiment, LC1 is allocated to the header fields of the initiation/refresh state, LC2 to the payload and LC3 to the FO/SO header fields of the first and second states. This allows uncompressed initiation/refresh state header fields to be separated from the compressed header fields. It is also possible that a separate connection is allocated for signalling data.

Unlike in FIG. 4, one PDP context can be used for transmitting data of various applications, in which case the data flows must be separated on the PDCP layer and they must have separate compression contexts. In principle, it is also possible to operationally implement the PDCP layer such that a plural number of PDP contexts are multiplexed on the PDCP layer whereby one RLC entity of the RLC layer receives data from a plural number of different applications. Also in this case differently compressed header fields may be transmitted on separate logical connections.

Figure 5:
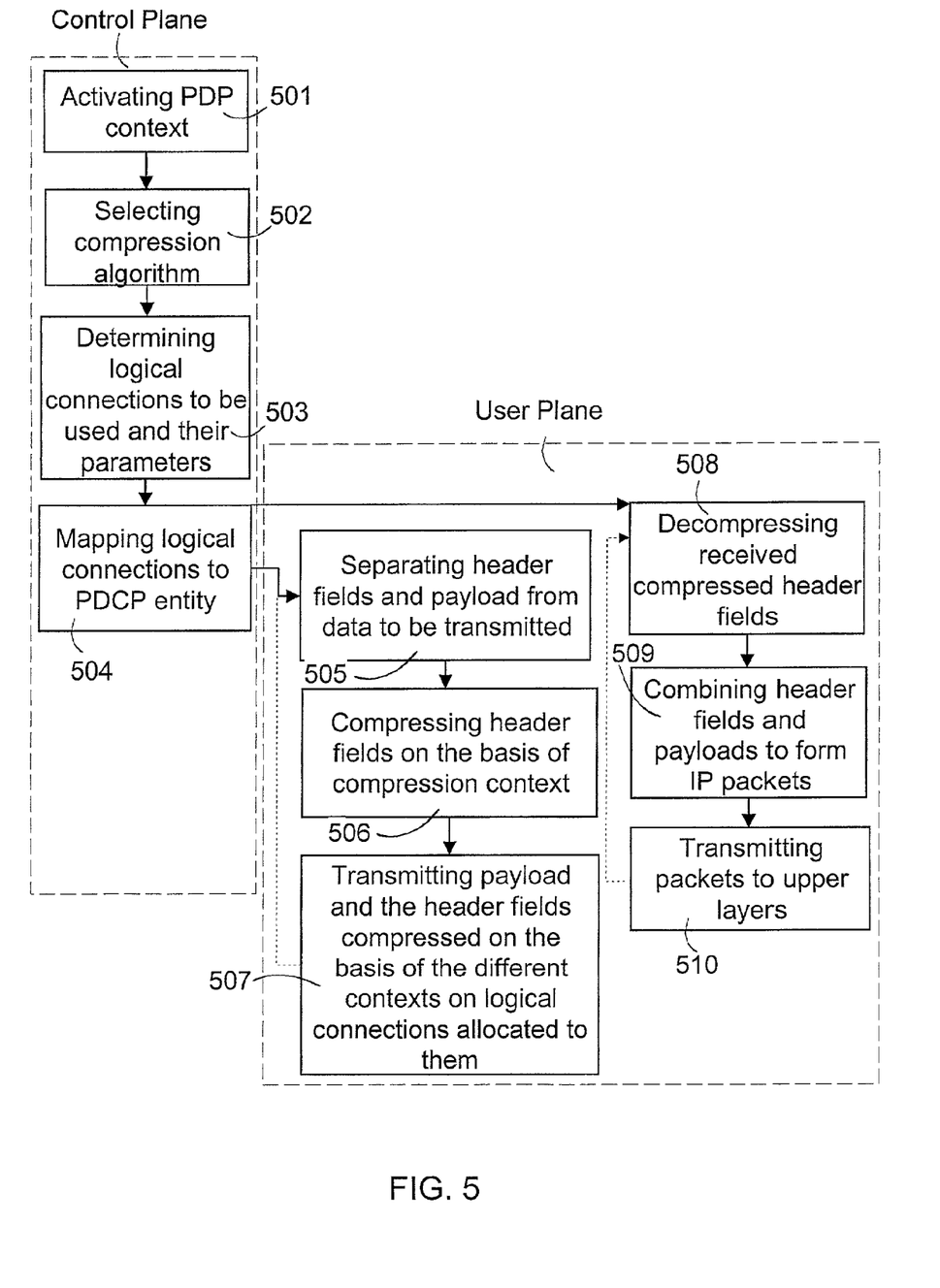
FIG. 5 is a flow diagram illustrating a method according to a preferred embodiment of the invention.

FIG. 5 is a flow diagram illustrating a method according to a preferred embodiment of the invention. A PDP context is activated 501 between the mobile station UE and the UMTS network by the initiative of higher core network protocols. In connection with the activation of the PDP context, a network-level protocol type is indicated to the RRC entities on the basis of which the RRC entities select 502 the compression algorithm to be used on the PDCP entity and the parameters guiding the algorithm. The logical connections to be allocated and their parameters are determined 503 between the RRC protocol entities. The network radio resource management entity (RRM) concludes, on an application-specific basis for example, how the logical connections are to be selected and then guides the RRC entity. The logical connections are determined in the mobile station UE by means of RRC signalling from the RNC. The parameters are determined 503 according to the characteristics of the data to be transferred, which makes an optimal use of the radio resources possible. At least different radio bearer parameters are preferably reserved for header fields conforming to different contexts. This allows the size of the radio frames used on the different logical connections to be adjusted. For example, a logical connection offering higher bandwidth and higher bit-error-ratio can be allocated to uncompressed header fields than to compressed header fields.

The RRC entity communicates with the PDCP entity through a PDCP Control Service Access Point (PDCP-C-SAP) shown in FIG. 4, the compression algorithm to be used being then informed to the PDCP entity and the logical connections mapped 504 to the PDCP entity.

When data is being transmitted, the header fields and payload of the packet to be transmitted are separated 505 in the convergence entity PDCP. The header fields are compressed 506 according to the negotiated compression algorithm and the compression context. In other words, the packet in question is preferably an IP packet, and therefore at least the IP header field and the TCP or UDP header field are compressed. If a real-time application using RTP is concerned, then the RTP header field is also among the header fields to be compressed. The PDCP checks the context of the compressed header field and transmits 507 the compressed header field on a logical connection conforming to the context, i.e. preferably the compress state. The payload is transmitted 507 on at least one logical connection allocated to it.

The header fields of the received data are decompressed 508 in the convergence entity PDCP according to the selected compression algorithm and the compression context. The header fields and payload are combined 509 in the convergence entity of the recipient. Entire IP packets are transmitted 510 to higher levels.

The logical connections may be reconfigured when necessary. When the convergence protocol entity is removed, the logical connections are typically released. A plural number of logical connections may be allocated to the payload as well, the connections being used for transmitting split payload portions which are then combined at the reception.

To ensure that the data is correctly combined, the reception end must be provided with buffering, or some other measures must be taken to minimize the delay differences of data transmitted on separate logical connections. According to a preferred embodiment of the invention, the channels used for the logical connections are synchronized. For the transfer of data in real-time applications, measures taken to provide data simultaneity offer a better solution than buffering.

In order for the header field and payload of one and the same IP packet to be combined, the logical connections must provide a reliable data transfer by employing sequence numbers or acknowledging, for example. On the other hand, delay is critical in real-time applications and therefore it suffices to detect the packets with erroneous or missing payload and/or header fields. Such packets can then be left untransmitted, in which case the header fields and payload of a different packet are not combined (509). For this purpose, the PDCP entities of RNC and MS may be provided with an error control which decides, on the basis of detected errors, whether the data is to be transmitted to upper layers. A separate error check can be provided for each logical connection.

The invention can be applied to the transfer of data of any application. The capacity needed by the WB AMR codec in particular can be substantially reduced by transferring payload and header fields on a plural number of separate logical connections.

The invention also provides an advantage with regard to the use of ROHC. Since the compression of data of a plural number of applications employing the same PDP context may be carried out by one and the same compression entity, the different data flows must be separated from each other with different context indicators CID. But now the header fields and payload of the different applications can be transferred on separate logical connections. This reduces the use of radio interface resources, because the CID identifiers are not needed.

The invention can be implemented by software in the mobile station MS and radio network controller RNC by using their processors, memory and interfaces. Hardware solutions may also be used.

It is apparent to a person skilled in the art that as technology advances, the basic idea of the invention can be implemented in various ways. The invention and its embodiments are therefore not restricted to the above described examples but they may vary within the scope of the claims.

The invention claimed is:

1. A method for transferring IP data comprising payload and header fields, the method comprising:
   allocating at least two logical connections for the transfer of header fields compressed on the basis of different compression states, wherein a logical connection is allocated to header fields of an initiation/refresh compression state and a logical connection for header fields of a first order compression state and header fields of a second order compression state; and
   transferring a compressed header fields on one of said logical connections, depending on a compression state of the header field.

2. A method according to claim 1, in which a radio resources control (RRC) protocol is used for the management of radio resources, wherein the parameters of said logical connections are signaled between RRC protocol entities;
   said logical connections are mapped to a packet data convergence protocol layer entity;
   said logical connections are reconfigured when necessary; and
   said logical connections are released in response to the removal of said convergence protocol layer entity.

3. A method according to claim 1, in which the compression is controlled on a packet data convergence protocol layer of a mobile communications system, wherein the header fields and payload of an IP packet to be transferred are separated on said convergence protocol layer;
   the header fields are compressed using a selected compression algorithm and compression context;
   the payload is transferred on a logical connection allocated to it and the header fields on logical connections allocated to them according to the context;
   the header fields received on the logical connections are decompressed on a convergence protocol layer of a recipient according to negotiated compression algorithm and compression context, and
   the header fields and the payload are combined on the recipient's convergence protocol layer.

4. A method according to claim 1, wherein at least separate radio bearer parameters are reserved for said logical connections to be allocated to the header fields compressed on the basis of different contexts.

5. A method according to claim 1, further comprising:
   synchronizing channels to be used for said logical connections.

6. A telecommunications system comprising compression means for compressing and decompressing header fields of IP packets to be transferred, wherein
   the telecommunications system is configured to allocate at least two separate logical connections for the transmission of header fields compressed on the basis of different contexts, the telecommunications system being configured to allocate a logical connection to header fields of an initiation/refresh compression state and a logical connection for header fields of a first order compression state and header fields of a second order compression state; and
   the telecommunications system is configured to transfer a compressed header fields on one of said separate logical connections, depending on a compression state of the header field.

7. A telecommunications system according to claim 6, wherein the telecommunications system is configured to allocate at least two logical connections for the transmission of the header fields compressed on the basis of different contexts and at least one logical connection for payload.

8. A telecommunications system according to claim 6 or 7, wherein the telecommunications system is configured to reserve at least separate radio bearer parameters for said logical connections to be allocated to the header fields compressed on the basis of different contexts.

9. A mobile station configured to transfer data to and from a packet radio network, wherein
   the mobile station is configured to allocate, in response to an instruction received from the packet radio network, at least two separate logical data link layer connections for the transmission of header fields compressed on the basis of different contexts, the mobile station being configured to allocate a logical connection to header fields of an initiation/refresh compression state and a logical connection for header fields of a first order compression state and header fields of a second order compression state; and the mobile station is configured to transfer a compressed header fields on one of said separate logical connections, depending on a compression state of the header field.

10. A mobile station according to claim 9, comprising a radio resources control protocol layer entity for controlling a packet data convergence protocol layer entity in the mobile station, wherein the radio resources control protocol layer entity is configured, in response to an instruction transferred by a radio resources control protocol layer of the packet radio network, to map the packet data convergence protocol layer entity to logical connections for payload and for at least two different compression states;

the packet data convergence protocol layer entity is configured to separate the payload and header fields of an IP packet to be transferred;

the packet data convergence protocol layer entity is arranged to compress the header fields using a selected compression algorithm and compression context; and the packet data convergence protocol layer entity is configured to transfer the payload and the header fields compressed on the basis of the at least two different compression states on the logical connections allocated to them.

11. A mobile station according to claim 9, comprising a radio resources control protocol layer entity for controlling a packet data convergence protocol layer entity in the mobile station, wherein the packet data convergence protocol layer entity is configured to decompress the header fields received on the logical connections according to a negotiated compression algorithm and compression context, and the packet data convergence protocol layer entity is configured to combine the header fields and the payload.

12. A network element for a mobile communications system comprising a data link layer configured to transfer data to and from a plural number of mobile stations, wherein the network element is configured to allocate at least two separate logical connections on the data link layer for transmission of header fields compressed on the basis of different contexts, the network element being configured to allocate a logical connection to header fields of an initiation/refresh compression state and a logical connection for header fields of a first order compression state and header fields of a second order compression state; and the network element is configured to transfer a compressed header fields on one of said separate logical connections, depending on a compression state of the header field.

13. A network element according to claim 12, the network element comprising a radio resources control protocol layer entity for controlling a packet data convergence protocol layer entity in the network element, wherein the radio resources control protocol layer entity is configured to transfer to a radio resources control protocol layer of the mobile station an instruction for the allocation of logical connections;

the radio resources control protocol layer entity is configured to map the packet data convergence protocol layer entity to logical connections for payload and for at least two different compression states;

the packet data convergence protocol layer entity is configured to separate the payload and header fields of an IP packet to be transferred;

the packet data convergence protocol layer entity is arranged to compress the header fields using a selected compression algorithm and compression context; and the packet data convergence protocol layer entity is configured to transfer the payload and the header fields compressed on the basis of the at least two different compression states on the logical connections allocated to them.

14. A network element according to claim 12 the network element comprising a radio resources control protocol layer for controlling a packet data convergence protocol layer entity in the network element, wherein the packet data convergence protocol layer entity is configured to decompress the header fields received on the logical connections according to a negotiated compression algorithm and compression context; and the packet data convergence protocol layer entity is configured to combine the header fields and the payload.

* * * * *

UNITED STATES PATENT AND TRADEMARK OFFICE
CERTIFICATE OF CORRECTION

PATENT NO. : 7,164,665 B2  Page 1 of 1
APPLICATION NO. : 10/045021
DATED : January 16, 2007
INVENTOR(S) : Ari Tourunen It is certified that error appears in the above-identified patent and that said Letters Patent is hereby corrected as shown below:

In Claim 1, Column 9, Line 63
Delete the word "fields" and replace it with the word --field--.

In Claim 6, Column 10, Line 46
Delete the word "fields" and replace it with the word --field--.

In Claim 9, Column 11, Line 5
Delete the word "fields" and replace it with the word --field--.

In Claim 12, Column 12, Line 6
Delete the word "fields" and replace it with the word --field--.

Signed and Sealed this

Seventeenth Day of February, 2009

JOHN DOLL
*Acting Director of the United States Patent and Trademark Office*